(12) United States Patent
Marshall et al.

(10) Patent No.: US 10,060,444 B2
(45) Date of Patent: *Aug. 28, 2018

(54) COMPRESSOR VARIABLE VANE ASSEMBLY (71) Applicant: PRATT & WHITNEY CANADA CORP., Longueuil (CA)

(72) Inventors: Andrew R. Marshall, Grand Valley (CA); David Menheere, Norval (CA)

(73) Assignee: PRATT & WHITNEY CANADA CORP., Longueuil (CA)

(*) Notice: Subject to any disclaimer, the term of this patent is extended or adjusted under 35 U.S.C. 154(b) by 0 days.

This patent is subject to a terminal disclaimer.

(21) Appl. No.: 15/361,877

(22) Filed: Nov. 28, 2016

(65) Prior Publication Data

US 2017/0074285 A1 Mar. 16, 2017

Related U.S. Application Data (63) Continuation of application No. 14/228,616, filed on Mar. 28, 2014, now Pat. No. 9,533,485.

(51) Int. Cl.
| | |
|---|---|
| *F04D 29/56* | (2006.01) |
| *F04D 29/54* | (2006.01) |
| *F04D 29/16* | (2006.01) |
| *F01D 17/16* | (2006.01) |
| *F01D 5/14* | (2006.01) |
| *B33Y 10/00* | (2015.01) |
| *F04D 29/02* | (2006.01) |
| *B33Y 80/00* | (2015.01) |

(Continued)

(52) U.S. Cl.
CPC .......... *F04D 29/563* (2013.01); *B22F 3/1055* (2013.01); *B22F 5/009* (2013.01); *B23K 15/0086* (2013.01); *B33Y 10/00* (2014.12); *B33Y 80/00* (2014.12); *F01D 5/143* (2013.01); *F01D 17/162* (2013.01); *F04D 29/023* (2013.01); *F04D 29/164* (2013.01); *F04D 29/542* (2013.01); *B23K 2201/001* (2013.01); *F01D 11/12* (2013.01); *F05D 2230/31* (2013.01); *F05D 2300/514* (2013.01); *F05D 2300/603* (2013.01); *F05D 2300/608* (2013.01); *F05D 2300/613* (2013.01); *Y10T 29/49245* (2015.01)

(58) Field of Classification Search
CPC ...... F01D 5/143; F01D 17/162; F04D 29/462; F04D 29/563
See application file for complete search history.

(56) References Cited

U.S. PATENT DOCUMENTS

| | | |
|---|---|---|
| 4,278,398 A | 7/1981 | Hull |
| 6,602,049 B2 | 8/2003 | Caubet et al. |

(Continued)

*Primary Examiner* — Audrey K Bradley
(74) *Attorney, Agent, or Firm* — Norton Rose Fulbright Cananda LLP (57) ABSTRACT

A variable vane assembly for a gas turbine engine compressor and method of manufacturing same is described. A plurality of projections on the inner and/or outer shroud protrude into the annular gas path, each projection being at least partially circumferentially disposed between two variable vanes and located adjacent the overhang portion thereof. The projections have an angled planar surface that is substantially parallel to a plane defined by a terminal edge of the overhang portion of the variable vanes when pivoted through a vane pivot arc.

20 Claims, 9 Drawing Sheets

(51) Int. Cl.
    *B22F 3/105*     (2006.01)
    *B22F 5/00*     (2006.01)
    *B23K 15/00*     (2006.01)
    *F01D 11/12*     (2006.01)
    *B23K 101/00*     (2006.01)

(56) References Cited

U.S. PATENT DOCUMENTS

| | | |
|---|---|---|
| 8,105,019 B2 | 1/2012 | McCaffrey et al. |
| 2014/0140822 A1 | 5/2014 | Capozzi et al. |
| 2016/0237845 A1* | 8/2016 | Teixeira .................. F01D 5/143 |

* cited by examiner

Fig-8

COMPRESSOR VARIABLE VANE ASSEMBLY

CROSS-REFERENCE TO RELATED APPLICATIONS

The present application is a continuation of U.S. patent application Ser. No. 14/228,616 filed Mar. 28, 2014, the entire content of which is incorporated herein by reference.

TECHNICAL FIELD

The application relates generally to gas turbine engine compressors, and more particularly, to variable vanes for such compressors.

BACKGROUND

Variable vanes, namely vanes which are not fixed but pivot about axes such as to vary the angle of the vane airfoil, are sometimes used in gas turbine engine compressors to optimize compressor operability and/or efficiency over the compressor speed range. These variable vanes may include variable inlet guide vanes (IGV) located directly upstream of the first compressor stage, or variable vanes which form part of one or more of the subsequent downstream stages in a multistage compressor (ex: first compressor stage and/or second compressor stage, etc.). Variable vanes enable optimized compressor efficiency and/or operability by providing a close-coupled direction of the gas flow into the immediately downstream compressor rotor, and/or may introduce swirl into the compressor rotor to improve low speed operability of the compressor, and thus the engine, as well as to increase the flow capacity at high speeds.

Such variable vanes extend between the inner and outer shrouds which define the perimeter of the annular gas path into the compressor, and the variable vanes pivot about their respective axes to modify the angle of the vane airfoils and thus provide a closer incidence match between the air flow entering exiting the vane and the blade angle of the rotor. However, as each of the variable vane airfoils pivots about its radially extending axis, the clearance gap between the base and tip of the vane airfoil and the surrounding inner and outer shrouds, respectively, also varies. This can lead to greater vane tip losses, which may negatively affect the aerodynamic performance of the vanes and thus the compressor.

Improvements in variable compressor vanes and methods of forming same are therefore sought.

SUMMARY

There is accordingly provided a method of manufacturing a variable vane assembly for a compressor of a gas turbine engine, the variable vane assembly including an inner shroud and an outer shroud radially spaced apart from each other to define therebetween an annular gas path through which a plurality of variable vanes radially extend between the inner and outer shrouds, each of the variable vanes is pivotable through a vane pivot arc about a respective span-wise vane axis and has a vane airfoil with an overhang portion disposed at a trailing edge thereof, the method comprising: forming a plurality of projections on at least one of the inner and outer shrouds, the projections protruding from an annular boundary surface into the annular gas path, each of the projections being at least partially circumferentially disposed between two of said variable vanes and located adjacent the overhang portion of each of said vane airfoils, including forming the projections have at least one angled planar surface that is substantially parallel to a plane defined by a terminal edge of the overhang portion of the variable vanes when pivoted through said vane pivot arc.

There is also provided a variable vane assembly for a compressor of a gas turbine engine, the variable vane assembly comprising: a plurality of radially extending variable vanes, each pivotable through a vane pivot arc about a respective span-wise vane axis and having a vane airfoil with an overhang portion disposed at a trailing edge thereof; and inner and outer shrouds radially spaced apart and each having a gas path facing annular boundary surface defining therebetween an annular gas path through which the variable vanes extend, and at least one of the inner and outer shrouds including: a plurality of projections protruding from the annular boundary surface into the annular gas path, each of the projections being at least partially circumferentially disposed between two of said variable vanes and located adjacent the overhang portion of each of said vane airfoils, the projections having at least one angled planar surface that is substantially parallel to a plane defined by a terminal edge of the overhang portion of the variable vanes when pivoted through said vane pivot arc.

BRIEF DESCRIPTION OF THE DRAWINGS

Reference is now made to the accompanying figures in which.

DETAILED DESCRIPTION

Figure 1:
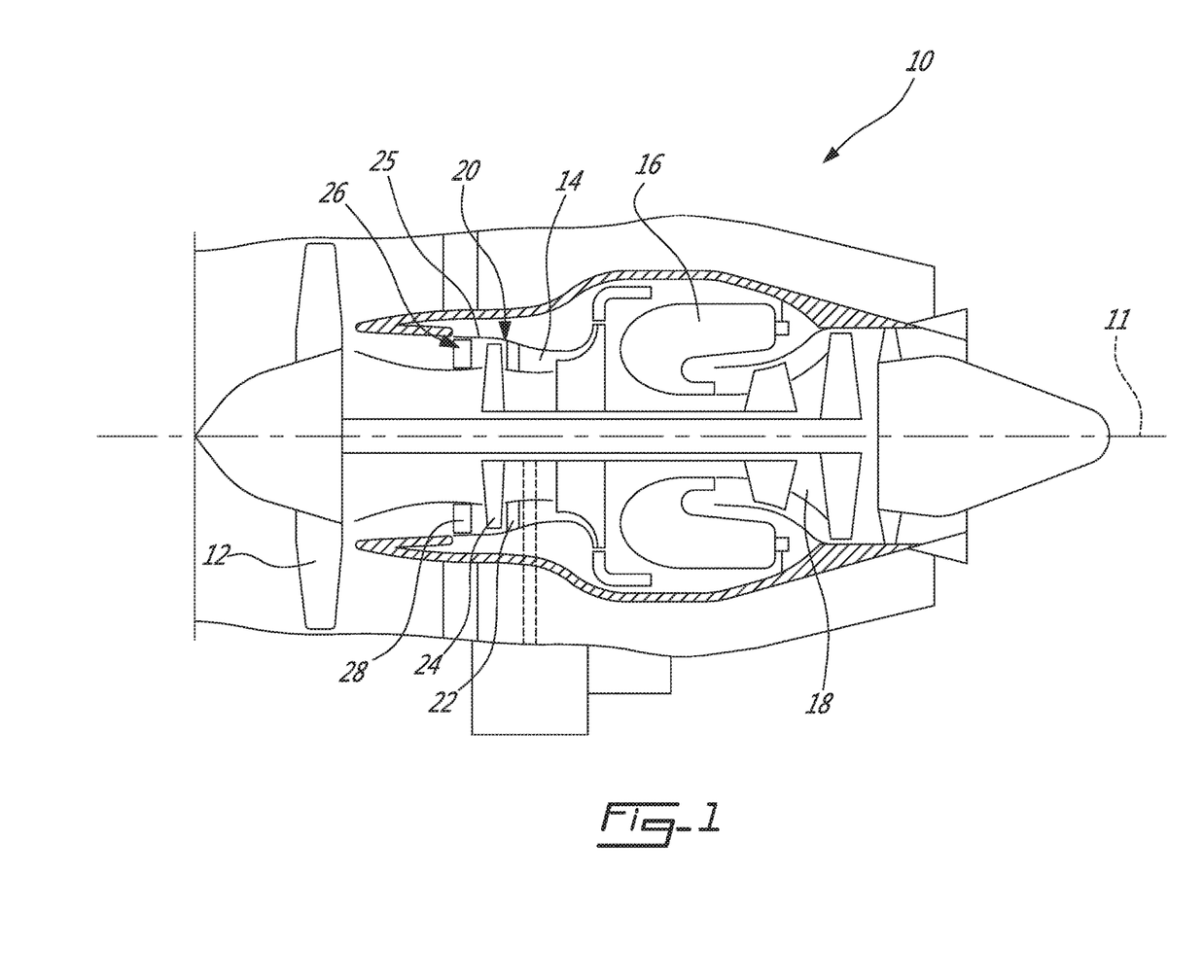
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases. The compressor 14 and turbine 16 are mounted on main engine shafts which rotate about a common longitudinal axis 11 of the engine. The multistage compressor section 14 includes at least a first stage, low pressure, axial compressor 20 located downstream of the fan 12. The compressor 14 of the gas turbine engine 10 may be a multi-stage compressor, and thus may comprise several axial and/or centrifugal compressors. Although a turbofan engine is depicted and described herein, it will be understood however that the gas turbine engine 10 may comprise other types of gas turbine engines such as a turbo-shaft, a turbo-prop, or auxiliary power units, and that the axial compressor 20 may form part of the compressor section of any of these types of gas turbine engines.

The first stage axial compressor 20 of the compressor section 14 comprises generally a rotor 24 and a stator 22 downstream of the rotor, each having a plurality of airfoils blades radially extending through the annular compressor gas path defined by the compressor gas flow passage 25. The compressor gas flow passage 25 may include a stationary and circumferentially extending outer shroud which defines a radial outer boundary of the annular gas flow path through the compressor 20, and an inner hub or shroud which is radially inwardly spaced from outer shroud and defines a radial inner boundary of the annular gas flow path through the compressor 20.

The compressor 14 may, in one possible embodiment, include an inlet guide vane assembly 26 located within the compressor inlet upstream of the rotor 24 of the first stage 20 of the compressor. Alternately, however, the compressor 14 may not comprise any IGVs, and instead include only several compressor stages, each comprising a rotor and a downstream vane assembly. The IGV assembly may be a variable vane assembly 26, as will be described in further detail below. Instead of, or in addition to, the variable IGV, the stator 22 of the first compressor stage 20 and/or any stator vane of any of the plurality of stages of the multistage compressor 20, may alternately comprise a variable vane assembly 26 as described herein. Accordingly, it is to be understood that the variable vane assembly 26 as described herein may be an IGV assembly, and/or may be a vane assembly forming any one or more of the compressor stages.

Regardless, the variable vane assembly 26 as described herein comprises a plurality of variable vane airfoils 28 which radially project through the compressor gas flow passage 25 and are operable to pivot about respective span-wise axes such as to modify and thus control the angle of the vane airfoils 28.

Figure 2A:
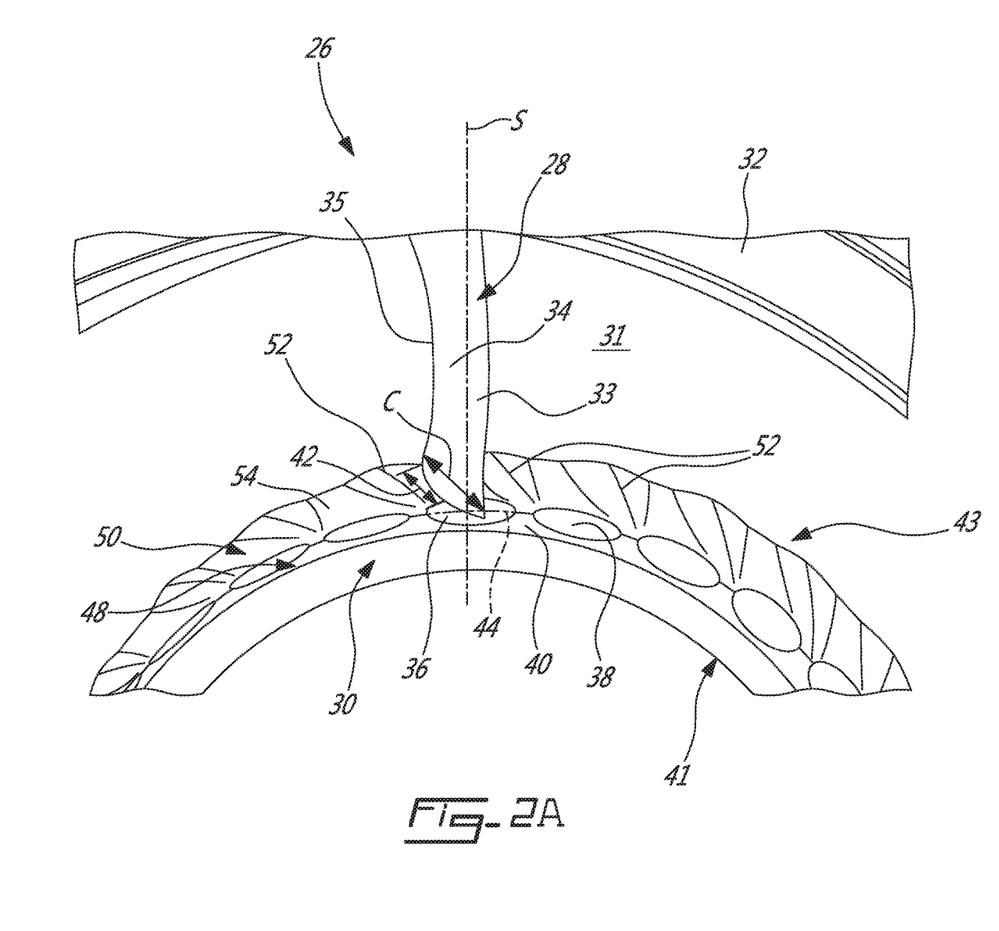
FIG. 2A is a partial front perspective view of a variable vane assembly of the gas turbine engine of FIG. 1.
Figure 2B:
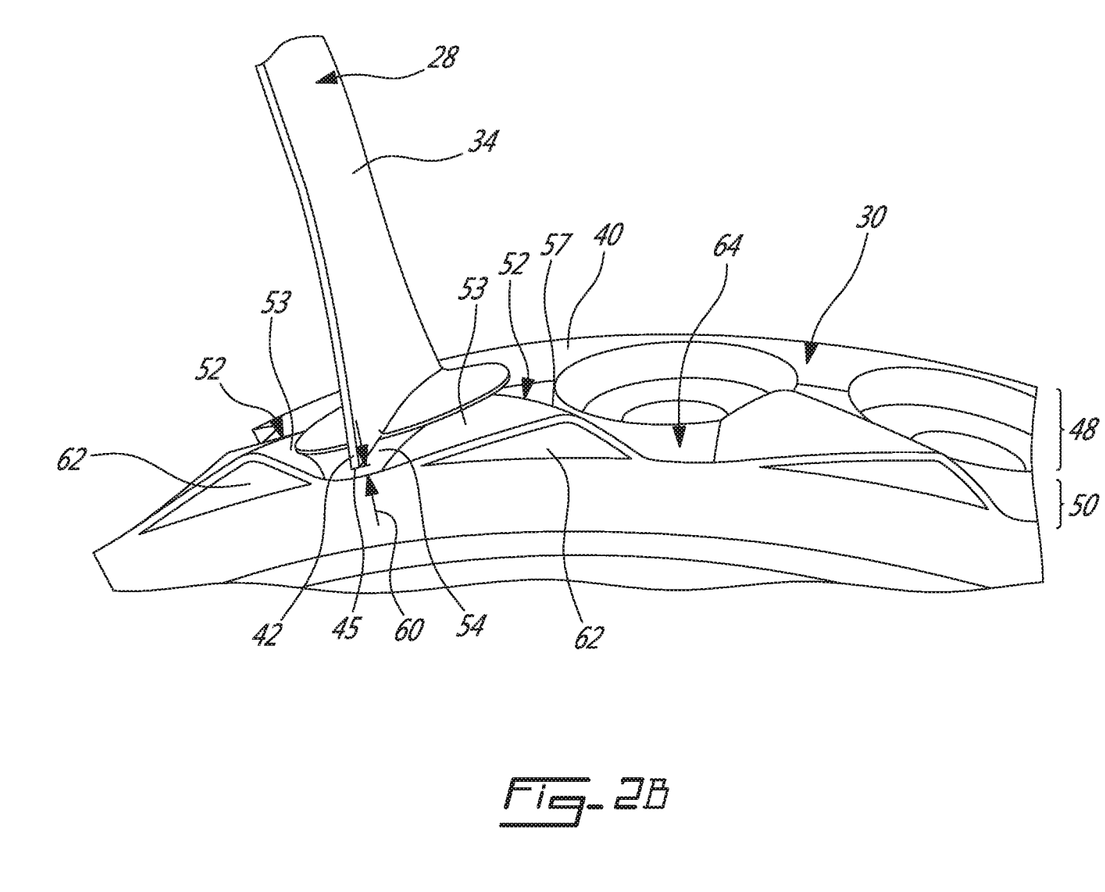
FIG. 2B is a partial rear perspective view of the variable vane assembly as shown in FIG. 2A, showing the variable vane in a first position, and having an inner shroud in accordance with one embodiment of the present disclosure.

Referring now to FIGS. 2A-2B, the variable vane assembly 26 includes generally a radially inner shroud 30, a radially outer shroud 32, and a plurality of variable vanes 28 (only one of which is shown, for ease of explanation), each of which is pivotable about its respective span-wise pivot axis S. In at least one particular embodiment, the span-wise pivot axes S of the variable vanes 28 may be substantially radially extending. The variable vanes 28 are circumferentially spaced apart about the variable vane assembly 26, and radially extend between the inner and outer shrouds 30 and 32. Each of the variable vanes 28 includes a central airfoil portion 34 and buttons 36 disposed on each of the radially inner and outer ends of the variable vane 28. The radially inner and outer buttons 36 (only the inner button is visible in FIG. 2) may be integrally formed with the airfoil portion 34 of the variable vane 28, and are substantially circularly shaped radial protrusions at each of the opposed ends of the variable vanes 28.

The buttons 36 are received within correspondingly shaped openings 38 formed the inner and outer shrouds 30, 32. Accordingly, rotation of one or both of the buttons 36 within the inner and outer shrouds 30, 32 causes corresponding rotation of the airfoil portion 34 of the variable vane 28 about its span-wise axis S. This therefore permits the angle of the variable vane 28 to be varied as required. The buttons 36 may, in one particular embodiment, be mounted on integrally formed trunions which extend for example through the shrouds. Each of the variable vanes 28 is actuated for pivoting about its respective span-wise axis S using an appropriate type of actuation mechanism, for example a gear arrangement, a lever assembly, a pneumatic or hydraulic system, etc. This actuation mechanism is in communication with, and operated by, a control system which is operable to vary the angle of the vanes 28 as desired.

The leading edge 33 of each airfoil 34 of the variable vanes 28 is substantially axially aligned with the buttons 36, which are disposed at the forward or upstream end of the vanes 28, such that the leading edge 33 of the vane airfoil 34 intersects the button 36 at a point at or within the outer periphery of the circular button 36. Because the cord-wise length C of the vane airfoil 34 at the radial ends thereof is greater than the diameter of the button 36, a downstream overhang portion 42 of the vane airfoil 34 projects beyond the perimeter of the button 36 toward a trailing edge 35 of the vane airfoil 34.

In traditional variable vane assembly designs, as the vane pivots about its own radial axis, a gap between the ends (radially inner and outer) of the vane airfoil and the adjacent annular gas path passage wall also varies. The size of this mainly radial gap will depend on the radius of the annular gas path passage wall and the angle at which the variable vane is positioned relative to this wall surface.

In the present variable vane assembly 26, however, one or both of the radially inner shroud 30 and the radially outer shroud 32 defines a non-smooth gas path facing surface on at least a downstream portion 50 of the shroud, in order to reduce the radial vane clearance gap 60, as seen in FIG. 2B. This radial vane clearance gap 60 is defined between the shroud 30 and the tip or edge 42 of the vane airfoil 34.

For simplicity of explanation, the inner shroud 30 of the variable vane assembly 26 will be described in detail herein. However, it is to be understood that the features and details of the outer shroud 32 are similar, and that those features described below which are also found on the outer shroud 32 correspond and operate in a similar manner (albeit inverted such as to face the annular gas path 31).

The inner shroud 30 of the variable vane assembly 26 includes a radially outer surface 41 facing away from the gas path 31 defined between the inner and outer shrouds 30, 32, and a radially inner surface 43, or annular boundary surface, facing towards the annular gas path 31. The radially inner boundary surface 43 of the inner shroud 30 includes an upstream portion 48 and a downstream portion 50. The downstream portion 50 may be disposed at least downstream of the openings 38 in the shroud 30 which receive the vane buttons 36 therein. In at least one embodiment, the downstream portion 50 is defined as being disposed rearward (i.e. downstream) of an annularly extending axis 44 which is axially aligned approximately with a midpoint of the circular openings 38 and therefore with a center of rotation of the variable inlet guide vanes.

At least the downstream portion 50 of the radially inner boundary surface 43 of the inner shroud 30 has an irregular surface profile relative to a nominal gas path boundary surface. This nominal gas path boundary surface of the inner shroud may, for example, may be defined by the smooth surface 40 disposed on the upstream portion 48 of the inner shroud 30 and facing the gas path 31. The irregular surface profile of the downstream portion 50 comprises, in the depicted embodiment, a plurality of projections 52 which protrude into the gas path 31 relative to the smooth and flat surface 40 of the upstream portion 48 of the shroud 30. The projections 52 may also be optimized such as to limit aerodynamic losses, and thus may be formed as flow optimization surfaces. As seen in FIGS. 2A and 2B, at least a portion of each of these projections 52 is disposed between each of the plurality of variable vanes 28. The projections 52 also act as gap-controlling elements as they maintain a substantially constant clearance gap between a radially inner end of the vane airfoil 34 and the inner shroud 30, as described herein.

Accordingly, the plurality of projections 52, which at least partially form the irregular surface profile of the downstream portion 50 of the boundary surface 43 of the inner shroud 30, are circumferentially spaced apart about the full circumference of the inner shroud 30, and are circumferentially offset from the vanes 28 such that at least one of the projections 52 is disposed between each pair of vanes 28. The irregular surface profile of the downstream portion 50 may also comprise recesses 54, in addition to the projections 52, which project (in the case of the inner shroud 30) radially inwardly into the material of the inner shroud 30 and thus which define troughs or grooves in the shroud 30 that extend below the nominal gas path surface of the shroud, as defined for example by the inwardly facing smooth surface 40 of the upstream portion 48.

The exact shape and configuration of the projections 52 which form the irregular surface profile of the downstream portion 50 of the inner shroud 30 is selected such as to minimize the radial clearance gap 60 defined between the radial edge of the overhang portion 42 of the vane airfoil 34 and the shroud 30, and to maintain this clearance gap 60 substantially constant throughout the range of travel of the pivoting variable vane 28.

Either the inner our outer shrouds may have such projections 52, which at least partially form the irregular surface profile of the downstream portion 50 of the inner shroud 30 and/or the outer shroud, may further be as described in U.S. patent application Ser. No. 14/133,873 filed Dec. 19, 2013, the entire content of which is incorporated herein by reference.

Figure 5:
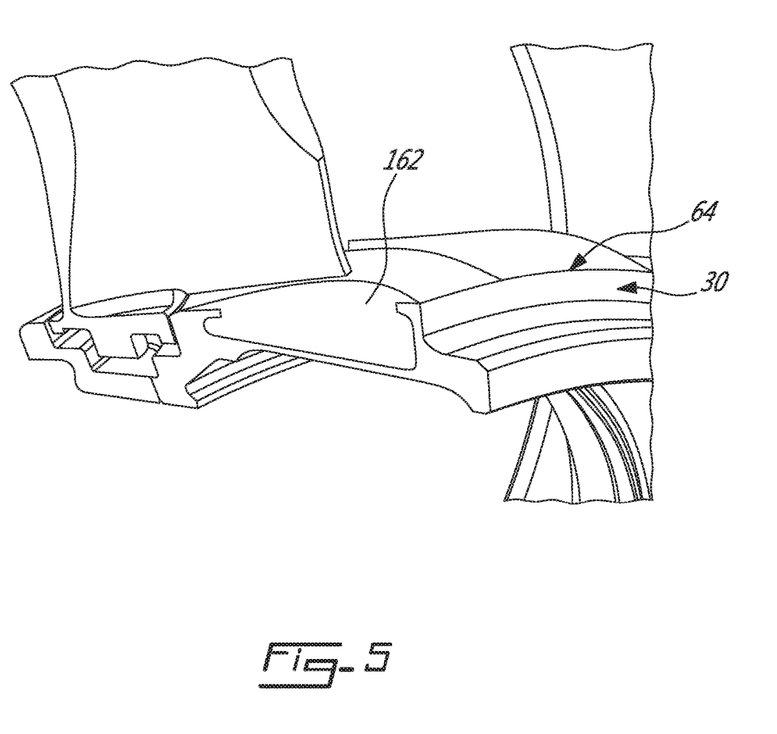
FIG. 5 is a perspective cross-sectional view of the variable vane assembly of FIG. 2A, having an inner shroud in accordance with another embodiment of the present disclosure.

Referring now to FIGS. 2B-5, one or more enclosed hollow cavities 62 are formed within the body of the shroud 30. These cavities 62 may be separate, non-interconnected, cavities 62 as seen in FIGS. 2B-4. In at least one alternate embodiment, as shown in FIG. 5, a single circumferentially extending annular cavity 162 is formed within the shroud body 30, which may include interconnected narrower cavity portions and larger cavity portions. The larger cavity portions of the cavity 162 being disposed beneath each of the protruding projections 52, in a manner similar to the cavities 62 as seen in FIGS. 2B-4.

In either case, the cavities 62, 162 are isolated from the annular gas path 31 and disposed radially beneath (i.e. radially inward, in the case of the inner shroud 30) at least each of the projections 52.

Figure 3:
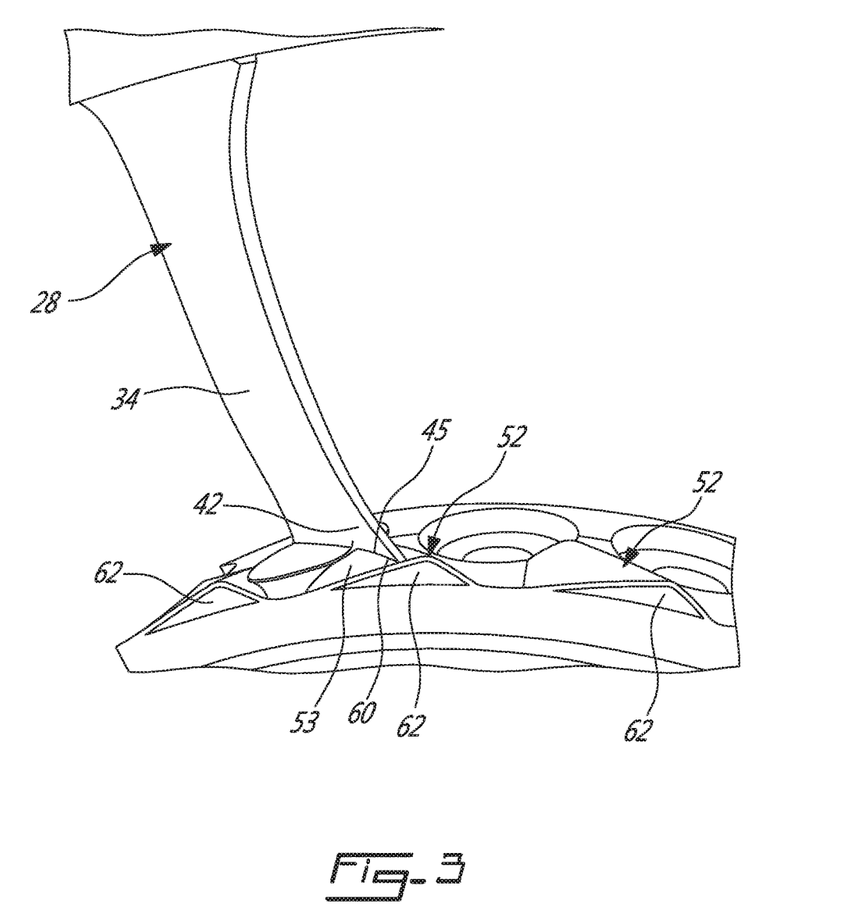
FIG. 3 is an enlarged rear perspective view of the variable vane of FIG. 2B.
Figure 4:
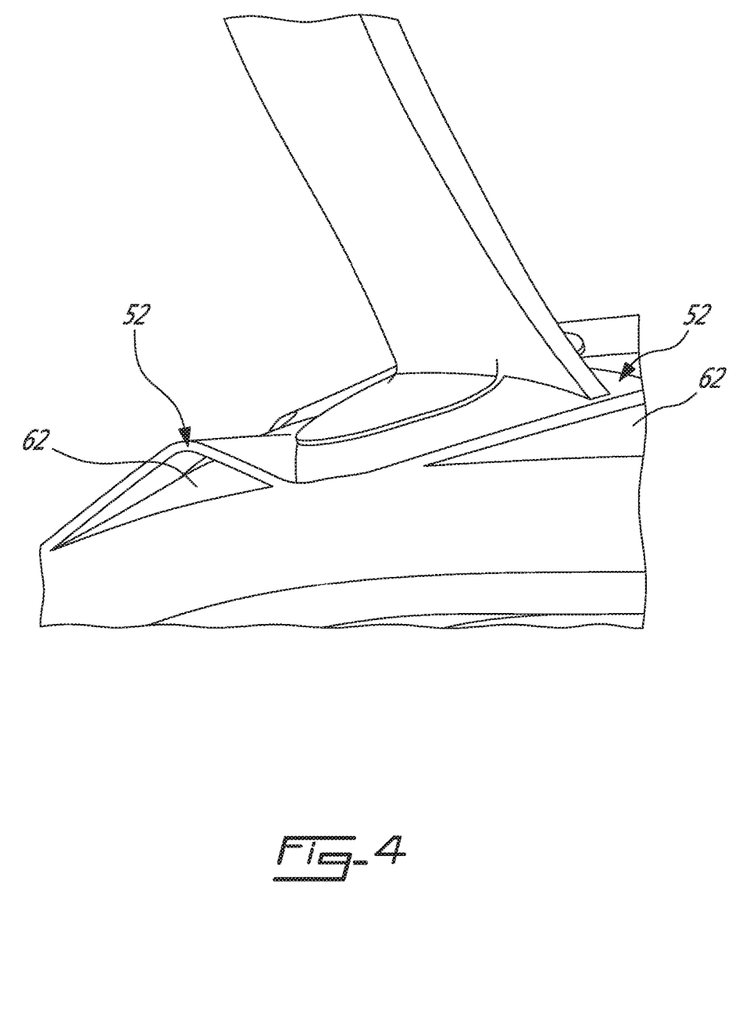
FIG. 4 is more detailed, partial rear perspective view of the variable vane assembly as shown in FIG. 2B, showing the variable vane in a second position.

As seen in FIGS. 2B-3, the projections 52, disposed above each of the cavities 62, has at least one angled planar surface 53 thereon that is substantially parallel to a plane defined by a terminal edge 45 of the overhang portion 42 of the variable vanes 28 when pivoted through said vane pivot arc. The radial clearance gap, defined between the angled planar surface 53 of the projection 52 and the terminal edge 45 of the vane airfoil overhang portion 42, remains substantially constant throughout a substantial portion of the vane pivot arc of the variable vane 28.

The irregular surface profile of the inner shroud 30 therefore includes a plurality of projections 52 which define angled planar surfaces (or tapered "ramp" surfaces) 53 thereon which accordingly provide gap-controlling surfaces that extend between recesses 54, formed between each of the projections 52, and the peak or uppermost ridge of the projections 52. The projections 52 may therefore have a tapered shape, and include a ridge 57 extending at an angle relative to a longitudinal axis (parallel to the longitudinal main engine axis 11) and at least one angled planar surface 53 terminating the ridge 57 and defining the gap-controlling surface. The slope of the angled planar surface 53 may, in at least one embodiment, be substantially constant along the length of the surface from a base (or planar region 54) to the ridge 57 of the projection 52. Additionally, as best seen in FIG. 2B, in at least one embodiment, the tapered projections 52 may be asymmetrical relative to the longitudinal axis, wherein the slope of the angled planar surface 53 is different from that of the angled surface on the opposite side of the ridge 57. The circumferential location and radial height of the projections 52 and the slope of the tapered/angled surfaces 53 are selected such that as the airfoil 34 of the variable vane 28 pivots about its radial span-wise axis (and the airfoil overhang 42 swings between the extreme ends of the pivoting travel of the variable vane), the radial clearance gap 60 (defined between the radially edge of the airfoil overhang 42 and the surface of the shroud 30) is maintained substantially constant through the full arc of travel of the pivoting vane 28. The slope of the tapered/angled surfaces 53 therefore is selected in consequence of, and is dependent on, the diameter of the annular shrouds, given that without such projections 52, the radial clearance gap 60 would be greater as the vane pivots further away from its centerline position, due to the curvature of the annular shrouds. As such, the projections 52 and tapered surfaces 53 of the irregular surface profile on the downstream portions of the shrouds maintains a substantially constant clearance gap 60 throughout travel of the variable vane, thereby enabling the leakage airflow through this clearance gap 60 to be minimized and accordingly reducing losses due to turbulence induced by flow between the vane blades 28 and the shrouds 30, 32 defining the gas path 31. This reduction in losses due to turbulence induced flow may result, consequently, in improved compressor operability over the complete range of motion of the variable vanes 28.

The radial clearance gap 60, defined between the terminal edge 45 of the airfoil overhang 42 and the surface of the shroud 30, is therefore maintained substantially constant through the full arc of travel of the pivoting vane 28. As can be seen in FIG. 2B, wherein the vane is located in a substantially fore-aft centerline position, the radial clearance gap 60 is defined between the terminal edge 45 of the downstream vane airfoil overhang 42 and the adjacent planar base surface 54 of the shroud 30 which defines the nominal gas path surface. When the variable vane 28 is pivoted about its own span-wise pivot axis S into an angled vane position, such as that shown in FIG. 3, the size of the radial clearance gap 60, now defined between the edge 45 of the downstream vane airfoil overhang 42 and the tapered/angled surface 53 of the projection 52 formed on the downstream portion 50 of the shroud 30, remains substantially the same as the gap when the vane was oriented in its centerline position (FIG. 2B).

As noted above and seen in the embodiment of FIG. 5, the inner shroud 30 may have a single annular cavity 162 formed in the body thereof, the cavity 162 extending about the full circumference of the shroud 30 within the downstream portion 50 thereof. This annular cavity 162 may also be composed of a plurality of smaller cavities which are interconnected to form the single uninterrupted annular cavity 162. The cavity 162 accordingly lies beneath the outer, annular boundary surface 64 which faces the gas path and from which the plurality of projections 52 extend. Accordingly, this hollow cavity or cavities 162 enables the shroud 30 to be much lighter weight than a corresponding solid metal shroud.

Figure 6:
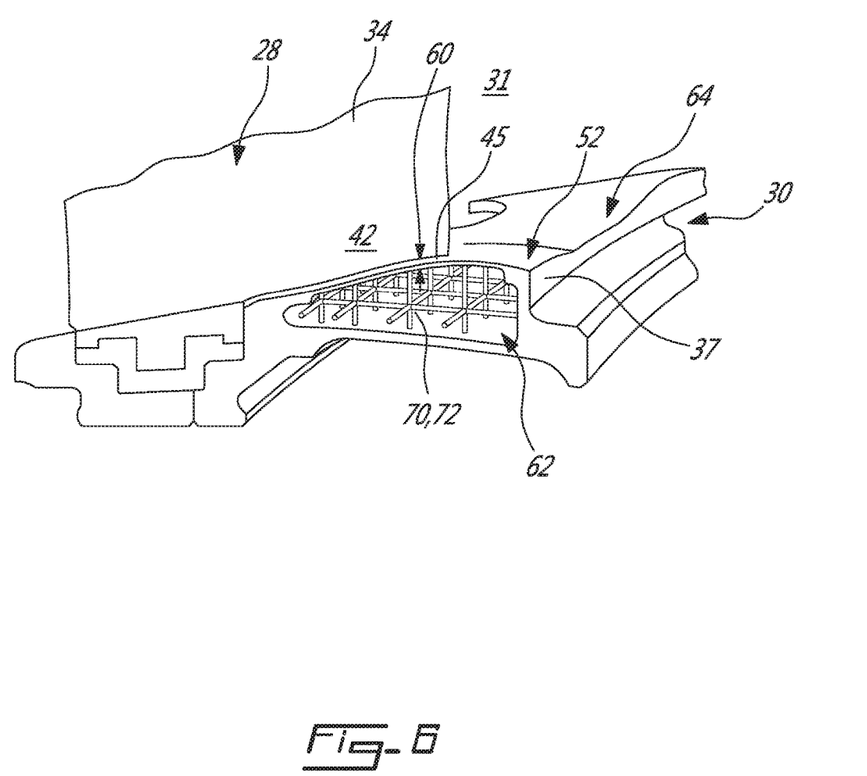
FIG. 6 is a perspective cross-sectional view of the variable vane assembly of FIG. 2A, having an inner shroud in accordance with a further embodiment of the present disclosure.
Figure 7:
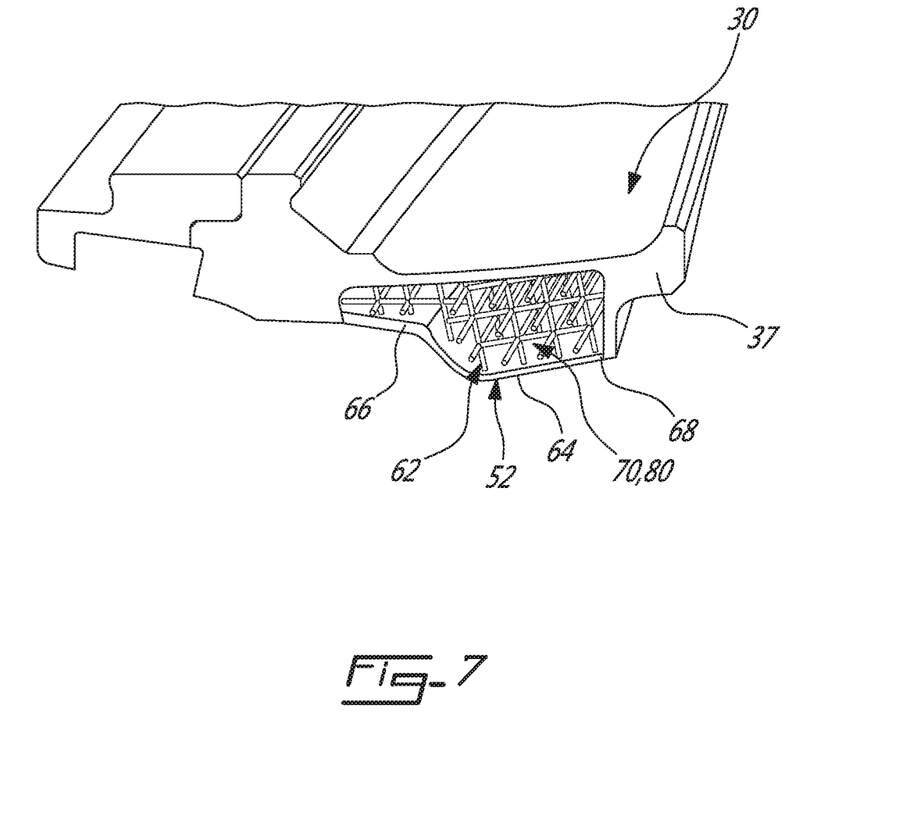
FIG. 7 is a perspective cross-sectional view of the variable vane assembly of FIG. 2A, having an inner shroud in accordance with another embodiment of the present disclosure and shown in isolation.
Figure 8:
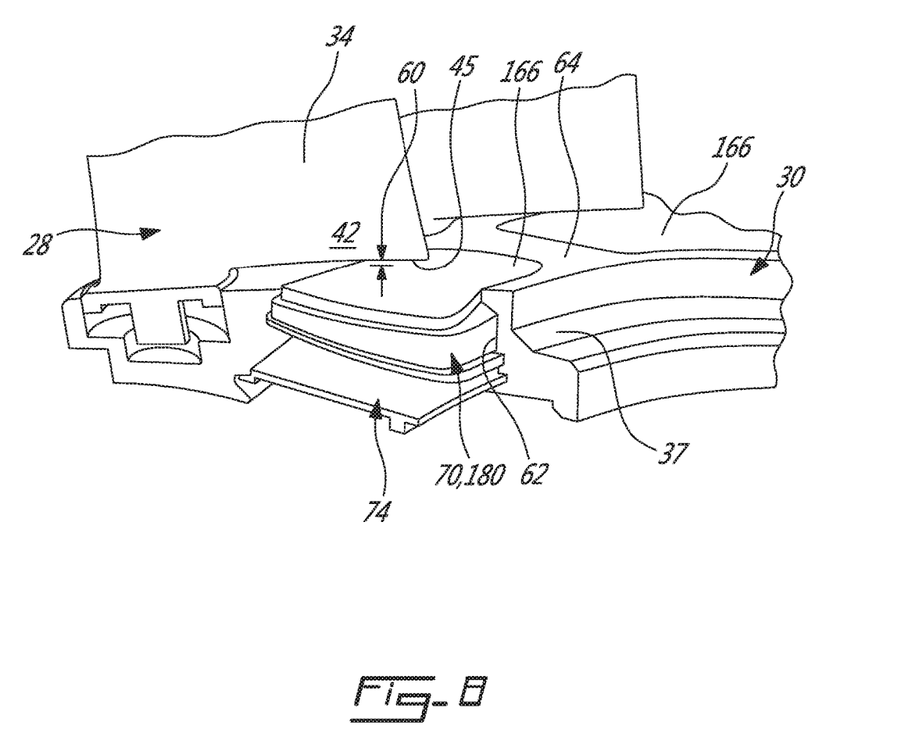
FIG. 8 is a partially sectioned perspective view of the variable vane assembly of FIG. 2A, having an inner shroud in accordance with yet another embodiment of the present disclosure.

As will be now seen with reference to FIGS. 6-8, the cavities 62 or cavity 162 may also comprise one or more structural inserts 70 therein. The structural inserts 70 may be referred to herein as "structural reinforcing elements", and may be either integrally formed with the surrounding should structure or may be separately formed and inserted into the cavity or cavities 162 within the shroud 30, after the formation of the respective cavity or cavities 162. The structural insert or structure reinforcing element(s) 70 may, in one embodiment, completely fill the respective cavity within which it is disposed. In a preferred, but not necessary, embodiment, the structural reinforcing elements 70 are lighter in weight than a corresponding solid filling the cavities, if such a solid was to be made of the same material (ex: metal or metal allow) as the remainder of the shroud body 30. As such, the structural reinforcing elements 70 is a load-bearing component of the shroud which helps to fulfill the necessary structural requirements of the shroud, including when the engine is in operation, while saving weight relative to comparable fully solid shrouds. In order to be weight saving, the structural reinforcing elements 70 may, in the embodiment as depicted in FIGS. 6 and 7, comprise a substantially porous structure including, but not limited to, a fully lattice structure 72 as shown. The lattice structure 72 may define a plurality of individual open cells which are interconnected and formed by a three-dimensional lattice shaped structure. This lattice structure 72 may have a variety of forms such as to define a variety of possible cell shapes, such as cubic, decahedron, etc. In all cases, however, the lattice structure 72 is substantially porous and provides structural reinforcement to the shroud while saving weight.

As seen in FIG. 6, the shroud 30 includes one or more cavities 62, defined within the body 37 of the shroud 30, within which are disposed structural reinforcing elements 70 in the form of load-bearing mesh or lattice structures 72 that completely fill each of the cavities 62. These structural reinforcing elements 70 are accordingly disposed beneath the outer, annular boundary surface 64 of the shroud which faces the gas path 31 and from which the plurality of projections 52 extend. More particularly, because the cavities 62 are circumferentially aligned with each of the projections 52, as noted above, the mesh lattice structures 72 of the structural reinforcing elements are similarly disposed radially beneath each of the projections 52.

In the embodiment of FIG. 6, the mesh lattice structure 72 of the structural reinforcing element 70 is integrally formed with the body 37 of the shroud 30. In other words, the lattice 72 of the structural reinforcing element 70 is formed at the same time, of the same material, and as a single monolithic piece with the remainder of the body 37 of the shroud ring 30. In one embodiment, this is achieved by manufacturing the entire shroud ring 30, including the structural reinforcing elements 70, using additive manufacturing, such as a direct metal laser sintering (DMLS) or electron beam melting (EBM) for example.

As shown in FIG. 7, the structural reinforcing elements 70, whether comprised of a lattice structure 72 or not, may alternately be separately formed from the body 37 of the shroud 30. In this case, the structural reinforcing elements 70 comprise inserts 80 which are separately formed and inserted into each of the cavities 62. This necessarily requires that the cavities 62 are accessible to do so, and therefore may have openings 68 formed in the outer surface 64 of the shroud body 37, for example, through which the inserts can be fed for introduction into the cavities 62. In this embodiment, the openings 68 of the cavities 62 are enclosed and sealed by an outer cover 66 which defines that portion of the outer boundary surface 64 of the shroud which overlies the inserts 80 of the structural reinforcing elements 70, and which may also include one of the projections 52. As the shape and form of the structural reinforcement 70 will dictate the corresponding shape of the outer shroud surface defined by the cover 66, the structural reinforcing elements 70 may therefore be used to form the projections 52. In this embodiment, therefore, the inserts 80 which define the structural reinforcing element 70 are accordingly used to form the projections 52 about the circumference of the shroud 30.

The inserts 80 may, in one possible embodiment, be formed of a material which is different from that of the material which forms the remainder of the body 37 of the shroud 30. For example, the inserts 80 may be formed of a composite material such as thermoset or thermoplastic, provided that the material selected is suitable for the gas turbine engine environment and able to withstand the required loads. Of course, the inserts 80 may also be composed of the same material as the remainder of the shroud body 37, such as a metal or metal alloy, particularly when the insert 80 is formed of a lattice structure 72 as shown in the embodiments of FIGS. 6 and 7. Because additive manufacturing is particularly useful for forming complex shapes such as such mesh type lattices structures, the inserts 80 may thus be formed by an additive manufacturing process. However, this is not required, particularly when the inserts 80 have a less complex shape. The inserts 80 may also be a porous metal foam material, in which case they need not be formed by traditional machining operations nor additive manufacturing.

Referring now to FIG. 8, in an alternate embodiment the shroud 30 may include inserts 180 which are substantially solid (i.e. not a porous mesh or lattice structure) and which are disposed within corresponding cavities 62 formed in the body 37 of the shroud. These solid inserts 80 may be composed, for example, of a light weight composite material, such as thermoset, thermoplastic, or the like, which may be formed by molding, injection or other suitable composite manufacturing methods. These inserts 180 nevertheless provide load-bearing capabilities and thus comprise structural reinforcing elements 70 in the same manner as those described above. As per the inserts 80 of FIG. 7, in this embodiment the solid composite inserts 180 disposed within the cavities 62 of the shroud are enclosed by an outer element 166 which overlies the inserts 180 and faces the gas path. This outer element 166 may also include, as its outwardly facing surface, at least an abradable outer layer which will wear during initial operation and thus enable the provision of an even tighter radial clearance 60 defined with the terminal edge 45 of the vane airfoil overhang 42. Alternately, the entire outer element 166 and/or the entire solid insert 180, may be a preformed abradable element. In this case, no outer element or cover 166 may be required, and the insert 180 itself provides the outer abradable layer which defines the clearance gap 60 with the vane overhang.

In the embodiment of FIG. 8, a button retention strip 74 is also provided, inward of the solid inserts 180. This button retention strip 74 be extend annularly about the full circumference of the shroud ring 30, or may comprise a number of separate arcuate segments disposed about the shroud ring 30, and being disposed at least beneath each of the inserts 180.

The above description is meant to be exemplary only, and one skilled in the art will recognize that changes may be made to the embodiments described without departing from the scope of the invention disclosed. For example, while the inner shroud 30 is described in detail above and depicted in the enclosed drawings as comprising the projections 52, in an alternate embodiment one or both of either the inner shroud 30 and the outer shroud 32 may be provided with an inwardly facing surface, facing the gas path, which has a similar surface profile including such projections. Modifications which fall within the scope of the present invention will be apparent to those skilled in the art, in light of a review of this disclosure, and such modifications are intended to fall within the appended claims.

The invention claimed is:

1. A method of manufacturing a variable vane assembly for a compressor of a gas turbine engine, the variable vane assembly including an inner shroud and an outer shroud radially spaced apart from each other to define therebetween an annular gas path through which a plurality of variable vanes radially extend between the inner and outer shrouds, each of the variable vanes is pivotable through a vane pivot arc about a respective span-wise vane axis and has a vane airfoil with an overhang portion disposed at a trailing edge thereof, the method comprising:

forming a plurality of projections on at least one of the inner and outer shrouds, the projections protruding from an annular boundary surface into the annular gas path, each of the projections being at least partially circumferentially disposed between two of said variable vanes and located adjacent the overhang portion of each of said vane airfoils, the projections being circumferentially offset from the variable vanes, including forming the projections having at least one angled planar surface that is substantially parallel to a plane defined by a terminal edge of the overhang portion of the variable vanes when pivoted through said vane pivot arc.

2. The method of claim 1, further comprising ensuring that a radial clearance gap defined between the at least one angled planar surface of the projections and the terminal edge of the vane airfoil overhang portion, remains substantially constant throughout a substantial portion of the vane pivot arc of the variable vane.

3. The method of claim 1, further comprising forming one or more enclosed cavities within said at least one of the inner and outer shrouds, the cavities being isolated from the annular gas path and disposed radially beneath at least each of the projections.

4. The method of claim 3, further comprising providing one or more structural inserts within said one or more cavities, the projections being formed over said one or more structural inserts.

5. The method of claim 4, further comprising separately forming the structural inserts, and inserting the structural inserts into said one or more cavities.

6. The method of claim 5, wherein a body of the inner and outer shrouds is formed from a first material, further comprising forming the structural inserts to be lighter in weight than a corresponding solid filling said one or more cavities and made of said first material.

7. The method of claim 6, further comprising forming the structural inserts from a second material different from and lighter than the first material.

8. The method of claim 6, further comprising forming the structural inserts to be porous.

9. The method of claim 8, further comprising forming the structural inserts from a mesh lattice structure.

10. The method of claim 4, further comprising integrally forming the structural inserts with a body of said at least one of the inner and outer shrouds as one-piece composed of a single material.

11. The method of claim 10, further comprising forming the structural inserts having a mesh lattice structure.

12. The method of claim 10, further comprising using additive manufacturing to integrally form said at least one of the inner and outer shrouds and the structural inserts.

13. The method of claim 12, wherein the additive manufacturing includes performing direct metal laser sintering (DMLS) or electron beam melting (EBM).

14. A variable vane assembly for a compressor of a gas turbine engine, the variable vane assembly comprising:

a plurality of radially extending variable vanes, each pivotable through a vane pivot arc about a respective span-wise vane axis and having a vane airfoil with an overhang portion disposed at a trailing edge thereof; and inner and outer shrouds radially spaced apart and each having a gas path facing annular boundary surface defining therebetween an annular gas path through which the variable vanes extend, and at least one of the inner and outer shrouds including:

a plurality of projections protruding from the annular boundary surface into the annular gas path, each of the projections being at least partially circumferentially disposed between two of said variable vanes and located adjacent the overhang portion of each of said vane airfoils, the projections being circumferentially offset from the variable vanes, the projections having at least one angled planar surface that is substantially parallel to a plane defined by a terminal edge of the overhang portion of the variable vanes when pivoted through said vane pivot arc.

15. The variable vane assembly of claim 14, wherein a radial clearance gap, defined between the angled planar surface of the projection and the terminal edge of the vane airfoil overhang portion, remains substantially constant throughout a substantial portion of the vane pivot arc of the variable vane.

16. The variable vane assembly of claim 14, further comprising one or more cavities within a body of said at least one of the inner and outer shrouds, the cavities isolated from the annular gas path and disposed radially beneath at least each of said projections.

17. The variable vane assembly of claim 16, further comprising one or more structural inserts disposed within said one or more cavities.

18. The variable vane assembly of claim 17, wherein the structural inserts are formed of one of a porous material, a mesh lattice structure or a solid material.

19. The variable vane assembly of claim 17, wherein a body of the inner and outer shrouds is formed from a first material, and the structural inserts are lighter in weight than a corresponding solid filling said one or more cavities and made of said first material.

20. The variable vane assembly of claim 19, wherein the structural inserts are formed of a second material different from the first material.

\* \* \* \* \*